US005483653A

United States Patent [19]

Furman

[11] Patent Number: 5,483,653
[45] Date of Patent: Jan. 9, 1996

[54] PRINTING SYSTEM WITH FILE SPECIFICATION PARSING CAPABILITY

[75] Inventor: Lisa D. Furman, Rochester, N.Y.

[73] Assignee: Xerox Corporation, Stamford, Conn.

[21] Appl. No.: 42,195

[22] Filed: Apr. 2, 1993

[51] Int. Cl.[6] .............................. G06F 3/12; G06F 13/14
[52] U.S. Cl. .................... 395/650; 364/DIG. 1; 364/240.8; 364/235; 364/285; 364/286.5
[58] Field of Search ................................. 395/650, 700

[56] References Cited

U.S. PATENT DOCUMENTS

| | | | |
|---|---|---|---|
| 3,597,071 | 7/1971 | Jones | 355/3 |
| 3,920,895 | 11/1975 | Vieri et al. | 178/26 |
| 3,958,088 | 5/1976 | Vieri | 178/26 |
| 4,623,244 | 11/1986 | Andrews et al. | 355/24 |
| 4,651,278 | 3/1987 | Herzog et al. | 364/300 |
| 4,899,136 | 2/1990 | Beard et al. | 340/706 |
| 4,937,036 | 6/1990 | Beard et al. | 340/706 |
| 4,939,507 | 7/1990 | Beard et al. | 340/706 |
| 4,947,345 | 8/1990 | Paradise et al. | 364/519 |
| 4,972,319 | 11/1990 | Delorme | 364/419 |
| 5,008,853 | 4/1991 | Bly et al. | 364/900 |
| 5,053,948 | 10/1991 | DeClute et al. | 364/200 |
| 5,065,347 | 11/1991 | Pajak et al. | 395/159 |
| 5,072,412 | 12/1991 | Henderson, Jr. et al. | 395/159 |
| 5,113,355 | 5/1992 | Nomura | 395/109 |
| 5,113,517 | 5/1992 | Beard et al. | 364/200 |
| 5,133,048 | 7/1992 | Parsons et al. | 395/111 |
| 5,153,577 | 10/1992 | Mackey et al. | 340/793 |
| 5,165,014 | 11/1992 | Vassar | 395/112 |
| 5,170,340 | 12/1992 | Prokop et al. | 364/143 |
| 5,226,112 | 7/1993 | Mensing et al. | 395/14 |
| 5,293,466 | 3/1994 | Bringmann | 395/114 |
| 5,295,236 | 3/1994 | Bjorge | 395/134 |
| 5,301,286 | 4/1994 | Rajani | 395/400 |
| 5,333,246 | 7/1994 | Nagasaka | 395/133 |
| 5,339,435 | 8/1994 | Lubkin et al. | 395/700 |

OTHER PUBLICATIONS

Alter et al, "The Coherent Reference Manual" Pub. by Mark Williams Company, 1991, pp. 602–604, 899–902.
Poor, Alfred "HP LaserJet 4Si: High Resolution Network Printing", PC Magazine, May 11, 1993 p. 40.
Cortese, Amy, "This Acrobat has Really Limbered Up" Business Week, Sep. 26, 194 pp. 114, 116.

*Primary Examiner*—Kevin A. Kriess
*Assistant Examiner*—St. John Courtenay, III
*Attorney, Agent, or Firm*—Gary B. Cohen

[57] ABSTRACT

A printing system, for producing prints from a print file designated by a print file specification expressed in a first format, is provided. The printing system includes a workstation and a print server for storing the print file. An operating system, employing a second format, cooperates with the workstation and the print server to permit communication between the workstation and the print server. A parsing arrangement converts the first format of the print file specification to an output string based on the second format when a call to output the stored print file is transmitted from the workstation to the print server.

19 Claims, 8 Drawing Sheets

35-1

```
Typical ASCII Job Ticket

%XRXbegin:              1.31
%XRXdisposition:        PRINT
%XRXsenderName:
%XRXtitle:              PostScript File
%XRXcopyCount:          1
%XRXpaperType-size:     216  279
%XRXdocumentPaperColors: white
%XRXpaperType-opacity:  opaque
%XRXpaperType-perFinish:   Plain 0  0
%XRXrecipientName:
%XRXrequirements:       simplex
%XRXsignature:          FALSE
%XRXsourceFile:         ...
%XRXdestination:        ...
%XRXdeleteSource:       FALSE
%XRXxImageShift:        5
%XRXyImageShift:        0
%XRXend
```

FIG. 3

FIG. 6
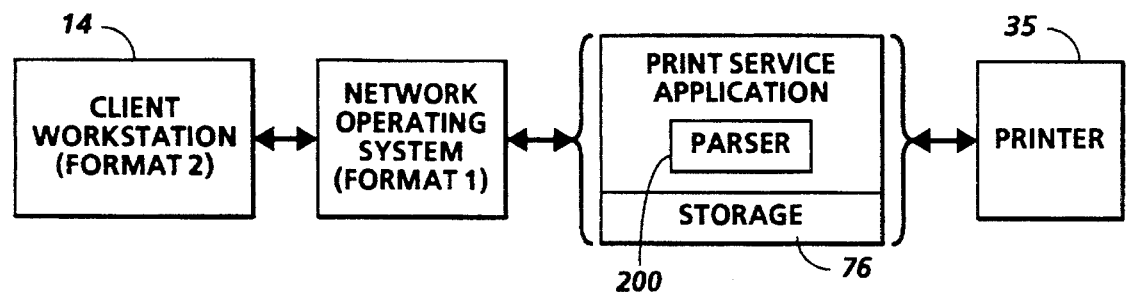
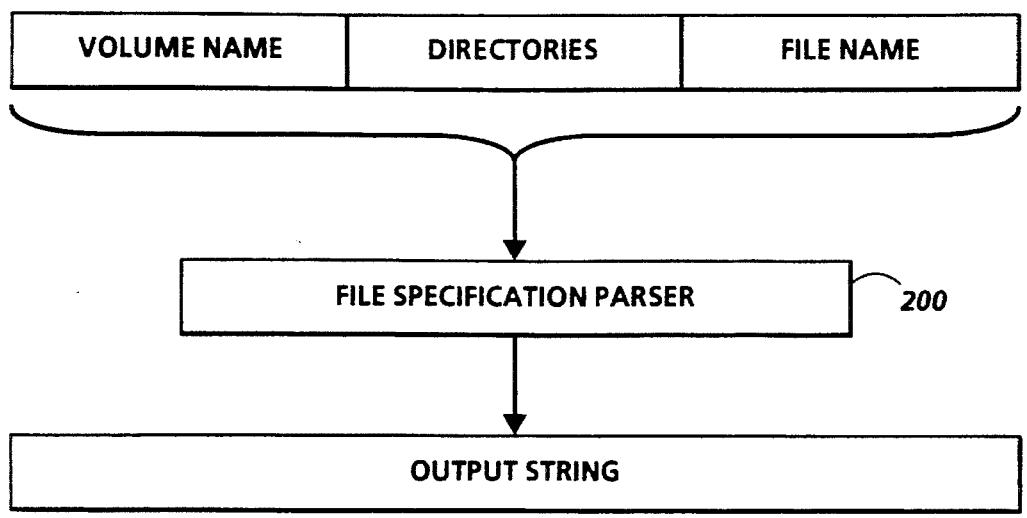
FIG. 8

PRINTING SYSTEM WITH FILE SPECIFICATION PARSING CAPABILITY

BACKGROUND OF THE INVENTION

The present invention relates generally to a technique for a printing system with an operating system and, more particularly, to an apparatus and method which permits a print service application to perform input/output operations on files whose formats necessarily differ from that of operating system of the printing system.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

The following patents include examples of systems noting a network, server and printer [usually for shared users' remote terminals]:

U.S. Pat. No. 3,920,895 Patentee(s): Vieri et al. Issued: Nov. 18, 1975

U.S. Pat. No. 3,958,088 Patentee(s): Vieri et al. Issued: May 18, 1976

U.S. Pat. No. 4,651,278 Patentee(s): Herzog et al. Issued: Mar. 17, 1987

U.S. Pat. No. 4,899,136 Patentee(s): Beard et al. Issued: Feb. 6, 1990

U.S. Pat. No. 4,937,036 Patentee(s): Sandman Jr. et al. Issued: Jun. 26, 1990

U.S. Pat. No. 4,939,507 Patentee(s): Beard et al. Issued: Jul. 3, 1990

U.S. Pat. No. 4,947,345 Patentee(s): Paradise et al. Issued: Aug. 7, 1990

U.S. Pat. No. 5,008,853 Patentee(s): Bly et al. Issued: Apr. 16, 1991

U.S. Pat. No. 5,113,355 Patentee(s): Nomura Issued: May 12, 1992

U.S. Pat. No. 5,065,347 Patentee(s): Pajak et al. Issued: Nov. 12, 1991

U.S. Pat. No. 5,072,412 Patentee(s): Henderson Jr. et al. Issued: Dec. 10, 1991

U.S. Pat. No. 5,113,517 Patentee(s): Beard et al. Issued: May 12, 1992

U.S. Pat. No. 5,153,577 Patentee(s): Mackey et al. Issued: Oct. 6, 1992

Other examples of printer controls include:

U.S. Pat. No. 5,133,048 Patentee(s): Parsons et al. Issued: Jul. 21, 1992

U.S. Pat. No. 5,170,340 Patentee(s): Prokop et al. Issued: Dec. 8, 1992

Now allowed U.S. patent application Ser. No. 07/591,324

Charles LeComte "The Xerox DocuTech® Production Publisher" BIS CAP International, Newtonville, Mass. October 1990

By way of further, early, background, the concept of various scanned paper or electronic imaging transmission input devices selectably electronically interfaced or networked to a flexible modular printer was disclosed in the following patents:

U.S. Pat. No. 3,597,071 Patentee(s) Burton Issued: Jul. 27, 1971

U.S. Pat. No. 4,623,244 Patentee(s): Andrews et al. Issued Nov. 18, 1986

Xerox® Corporation presently is marketing a server for a printing apparatus, the server being referred to as the DocuTech® Network Server ("DocuTech Network Server" is a trademark of Xerox Corp.) This server is adapted to translate a job written in a first PDL, such as PS or HP-PCL, into a second PDL, such as Interpress, for printing of the job on a Xerox® compatible printing apparatus. At the heart of the server are two interpreters, one of which is adapted to translate PS and the other of which is adapted to translate PCL. Each interpreter contains software, written by either Adobe® Systems Inc. or Peerless® Corp. to facilitate the translation process. Additionally, Eastman Kodak produces a network printing system, known as "LionHeart™", which employs a print server. Finally, the following reference is of interest in the network systems area:

Cheryl E. Currid and Craig A. Gillett "Mastering Novell® Netware®" SYBEX, Inc., Alameda, Calif. 1990

A PDL is a method of describing printed page(s) in a printer independent format. A PDL establishes an interface between a print driver or client and a print server or printer. The following references are pertinent to the area of page description languages:

PostScript® Language Reference Manual Second Edition Addison-Wesley Publishing Co. 1990

PCL 5 Printer Language Technical Reference Manual First Edition Hewlett Packard Co. 1990

Harrington, S. J. and Buckley, R. R. Interpress: The Source Book Simon & Schuster, Inc. New York, N.Y. 1988

All of the pertinent portions of the above-cited references are incorporated herein.

As is noted in art cited above, the control of, and software for, printers in a system or network environment can be in the printer itself. Commonly, however, a major part of the system printer integration software operation may be in the print server connected into the system, (typically a stand alone but dedicated small computer or PC). Another name for or type of unit providing print server capability or functions is a "shared interface unit".

Printers (and printer controllers or servers) are also sometimes referred to as "shared resources" in a networked environment. The server typically functions as a "spooler" to buffer the jobs that are sent to it, as well as a page description language (PDL) "decomposer", for converting the PDL files (e.g., "Interpress™" or "PostScript"®) to bitmapped files for application to the printer.

Another example of an established commercial integral system, with a shared printer and system server, comprises the Xerox Corporation "VP Local Laser Printing" software application package, which, together with the Xerox "4045" (or other) Laser Copier/Printer (CP), the "6085" "Professional Computer System" using Xerox Corporation "ViewPoint" or "GlobalView®" software and a "local printer [print service] Option" kit, comprises the "Documenter" system. The laser printer prints text and graphics with high quality resolution on a variety of paper sizes and special papers, including transparencies, labels, and envelopes. [When equipped with the optional copier feature, the "4045" CP also alternatively provides quick copies, functioning as a copier.] Printing occurs as a background process, enabling system users to continue with other desktop activities at their terminals. VP Local Laser Printing software can be loaded at a networked, remote, or stand alone Xerox "6085" Professional Computer System (workstation).

The even earlier Xerox Corporation "8000" "Xerox Network Services Product Descriptions" text further describes other commercially available Xerox Corporation electronic document printing systems. It notes that such document systems can support the capabilities of remote workstations, PC terminals, and facsimile devices, and connect them for shared use of an electronic printer, usually via a print server and/or shared user interface formatting print service. The software system can also control local print job queue management, etc. The print service will accept a print job from any device with access to the network which can be formatted or reformatted to the Xerox Interpress™ [or other such electronic printing standard or printing protocol]. It allows the client to submit a printing job, including an Interpress™ or other such standard master and a number of job parameters, such as paper size, number of copies, and device-specific information. The printing protocol also allows the client to query the print service regarding the status of the job, for user notification.

The electronic printing standard includes a specific set of instructions for printing in a standard for representing documents digitally. The Interpress™ standard for representing printed pages is already supported by a wide range of Xerox Corporation and other products. The print service understands and processes Interpress™ instructions received from a workstation, transforming them into a format understood by the printer. The Interpress™ standard is comprehensive; it can represent any images that can be applied to paper (including complex graphics) and a wide variety of font styles and characters. Each page of an "Interpress™" master can be interpreted independently of others. This allows a user to easily produce new masters from existing ones and allows the printer to selectively print pages from any master it receives.

Although a "formatting print service" may not have a printer directly attached, it can perform much the same as a print service that does. The typical principal difference is the transferring of an Interpress™ master into an internal format understood by the printer. The formatting print service creates a secondary Interpress™ master which accurately represents the same image but in a subset of Interpress™ which can be directly processed by the designated or target printer. This secondary Interpress™ master is then transmitted to the formatting print service's target printer for processing and printing.

Workstations on the network with conversion software can interact with the print service. This software runs automatically when users request that a document be printed. It converts the document format used by the workstation into an Interpress™ master which is transmitted to the print service. This transfer is implemented by a network queuing subsystem which implements the printing protocol and interfaces with an internal print queue for the tracking of the Interpress™ master. The internal print queue facilitates the movement of documents through the various stages of processing. The queue can hold a large number of documents, which are processed in the order received, or can be reprioritized. Generally, a print job is available in the printer's output tray within minutes after the user initiates the print request. The user can see the status of a print job and its place in the queue by making a request through the print server terminal or at the workstation. The resulting display will tell the user whether the job is being queued, formatted or printed. Once the document has been printed, the print service can delete the Interpress™ master.

The Interpress™ master is also accompanied by properties and options which specify document name, user name, and creation date. The print service interprets the master and then directs the printer during the printing process. This process involves several stages: queuing, formatting, and either printing, transmitting (in the case of facsimile print service) or forwarding to another print service (in the case of the formatting print service). During the printing or Fax transmission stage, messages may be generated to report any problems with the printer, such as a need to replenish the paper supply.

Different workstations can access the print service in different ways. To print a document, desirably the user can simply "copy" or "move" the document, with a mouse click or other command, to a printer icon on the workstation desktop, and set the displayed printing options, as on Xerox Corporation workstations. From other workstations such as the IBM PC's, the user may need to select menu items or type in commands to obtain access. The workstation selectable print options can include the number of copies, selected pages to be printed, paper size, image orientation, a choice of printers, and phone numbers when sending to a facsimile device. In addition, the option sheet allows the user to specify whether to delete the Interpress™ or other master, or retain it at the workstation desktop. Already print-formatted or master documents may be transmitted to the printer directly, eliminating the need to repeat the conversion or decomposition process if another copy of the document is desired. If saved, an Interpress™ master can be stored at the file service or even mailed to one or more individuals via an electronic mail service.

Utilizing an inter-network routing service, users can transmit Interpress™ or other printing masters through a network and then across an internet, typically, via telephone lines, twisted pair wires, coaxial cables, microwaves, infrared, and/or other data links, allowing documents created in one location to be automatically routed to a print service and printer hundreds or even thousands of miles away, in seconds or minutes.

The above-mentioned DocuTech™ Network Server couples one or more workstations with a print server by way of a network operating system, such as Netware®. The print server preferably employs a print service software application which recognizes files having paths or file specifications written in a DOS™ format. It has been found, however, that the print service software application does not recognize non-DOS™ file specifications unless they are expressed in DOS™ format. It would be desirable to provide a print server, with a print service application which is adapted to recognize files that derive from both DOS™ and non-DOS™ based workstations.

SUMMARY OF THE INVENTION

In accordance with the present invention there is provided a printing system for producing prints from a print file designated by a print file specification expressed in a first format, including: a workstation; a print server for storing the print file; an operating system employing a second format, the operating system cooperating with the workstation and the print server to permit communication between the workstation and the print server; and means for converting the first format of the print file specification to an output string based on the second format when a call to output the stored print file is transmitted from the workstation to the print server.

Additionally, there is provided a method of producing prints in a printing system with a selected print file designated by a file specification expressed in a first format, the printing system including a workstation and a print server capable of storing files, the workstation and the print server communicating with one another through an operating system employing a second format, including the steps of: storing the selected print file to the print server; transmitting a signal from the workstation to the print server calling for the output of the stored print file, the signal including the file specification; converting the first format of the file specification to the second format of the operating system for placing the print file in an outputable form.

These and other aspects of the invention will become apparent from the following description, the description being used to illustrate a preferred embodiment of the invention when read in conjunction with the accompanying drawings.

BRIEF DESCRIPTION OF THE DRAWINGS

FIG. 3 is a representation of a format for an electronic job ticket;

FIG. 6 is a partial, block diagrammatic view of the printing system of FIG. 1;

FIG. 8 is a block diagram illustrating a preferred approach for parsing a file specification to form an output string.

DESCRIPTION OF A PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
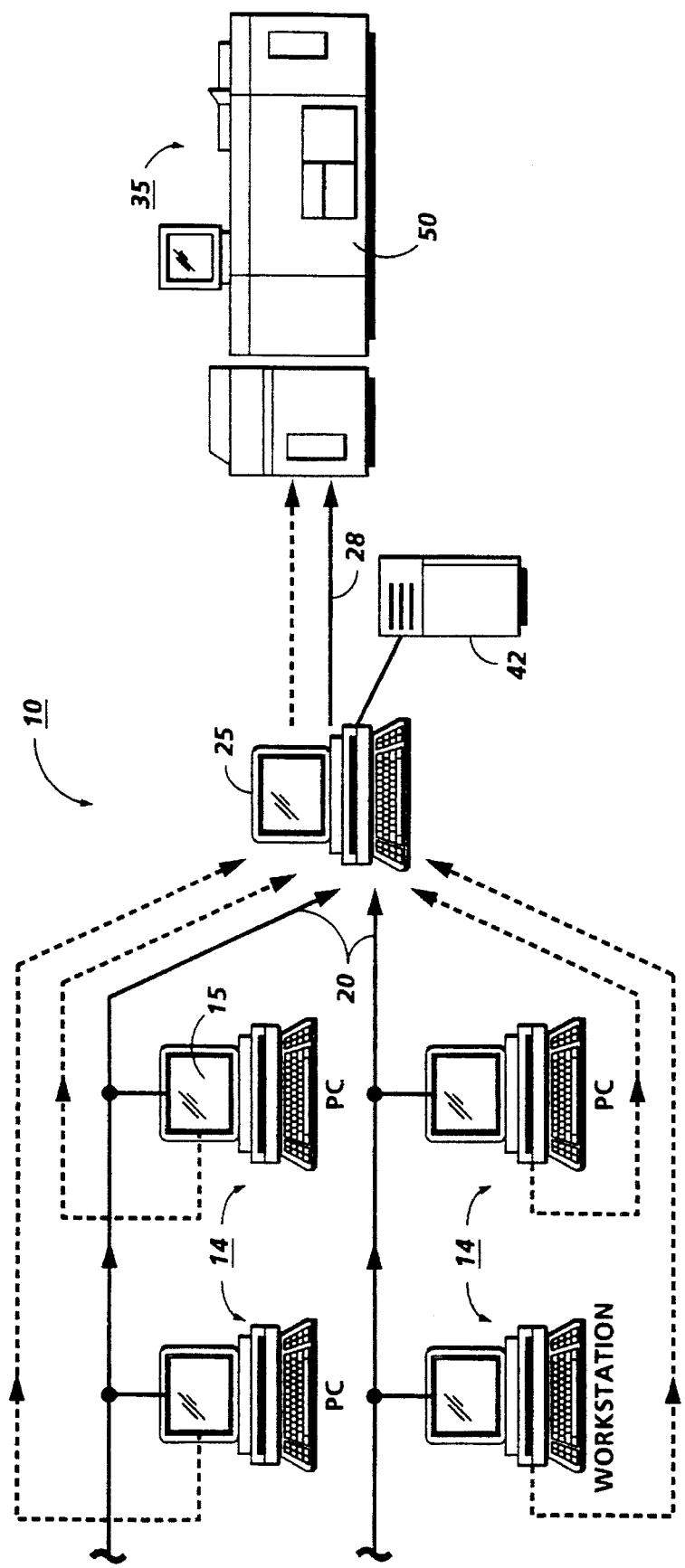
FIG. 1 is a schematic view of a printing system including a plurality of client workstations interfaced with a printer by a print server.

Referring to FIG. 1, there is shown a printing arrangement, designated generally by the numeral 10. The printing arrangement 10 includes a plurality of remote inputs such as PCs, workstations, etc. (referred to herein as workstations 14), coupled via one or more networks 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35. While separate networks 20, 28 are shown, a single network may instead be used.

Figure 2:
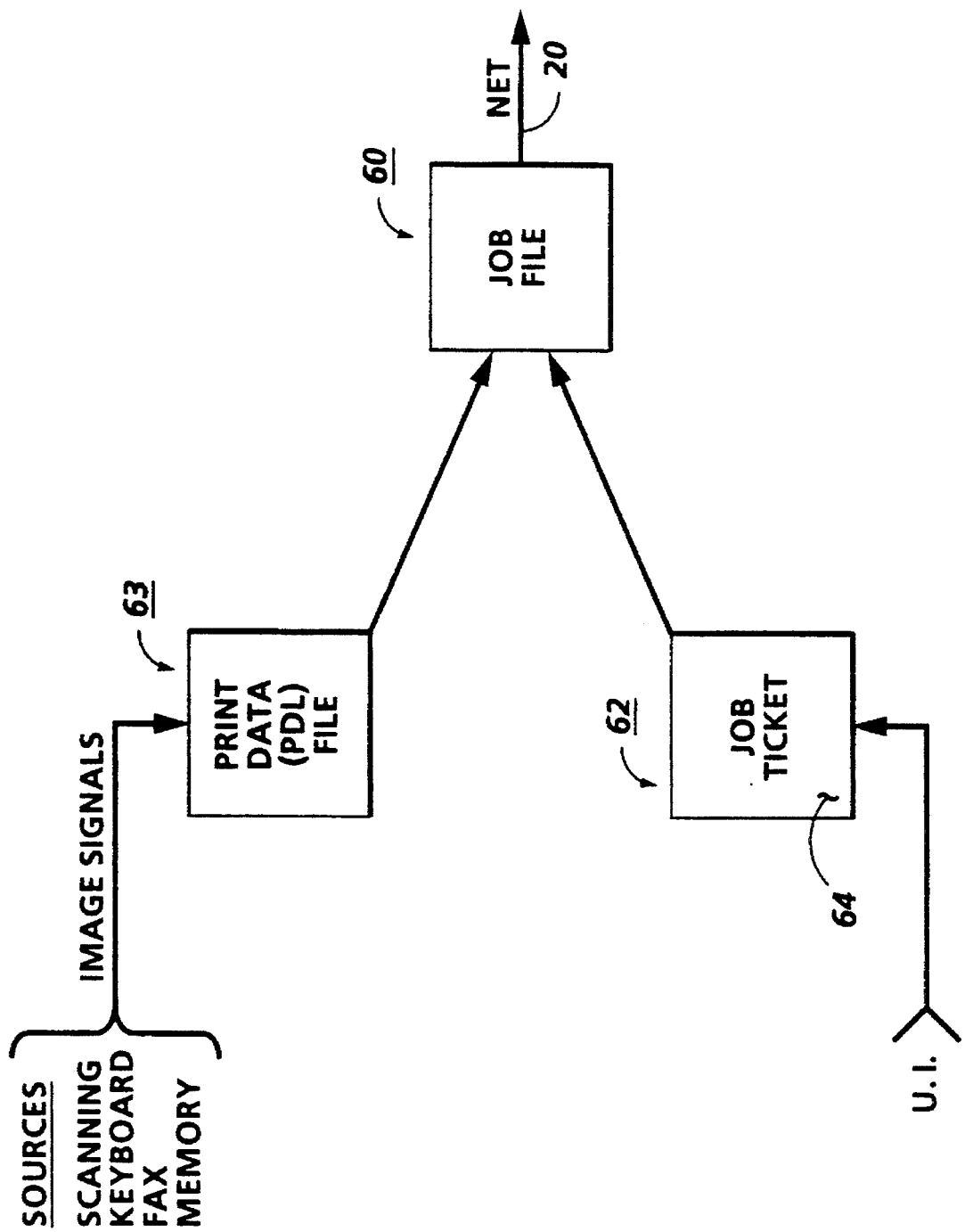
FIG. 2 is a schematic view of a job file and the contents thereof.

Referring to FIG. 2, electronic job files 60, or parts thereof, are created at the individual workstations 14, each job file being comprised of a Job Specification 62 and Print Data file 63 expressed in a PDL. Job Specification 62 is in the form of a client server job ticket 64 having instructions for routing, handling, and processing the job 62. As will be clarified from the discussion below, in the preferred embodiment of the present invention, the PDL of print data file 63 is either written in Postscript® ("PS") or Hewlett Packard Printer Control Language ("HP-PCL"). The jobs in Print Data file 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels or PDL instructions in Print Data File 63 are arranged as electronic documents or pages for printing on a print media such as paper stock or sheets.

The programming instructions in the client server job ticket 64 accompanying the job file 60 may include selection of the printer in the case where plural printers are available for the client or user to choose from in printing system 35. Where a printing system 35 has printers with different features, functions, speeds, etc., it may be necessary that the client select the printer that is to be used initially so that a client server job ticket 64 with the program selections available with that printer may be displayed at the client's workstation 14 as described more fully in U.S. patent application Ser. No. 07/752,155, filed Aug. 29, 1991, entitled "Dialog Filtering," the pertinent portions of which are incorporated herein. During the printing process, the server 25 transmits the printing instructions from the client server job ticket 64 to the printing system selected.

Referring to FIG. 3, the client server job ticket 64 may assume an ASCII format. Additionally, by employment of suitable client UI interface dialog software, print job selections may be displayed on the display screen 15 so that the user can be apprised of which printing selections are available for programming a print job. Examples of client server job ticket displays are shown in U.S. patent application Ser. No. 07/898,045, filed Jun. 12, 1992, entitled "Method of Translating a Plurality of Printer Page Description Languages," the pertinent portions of which are incorporated herein. The client at the workstation interactively fills out the client server job ticket by making selections electronically using the workstation mouse, keyboard, etc. It should be recognized that the client server job ticket instructions encompass not only print programming instructions for the job itself but also routing and handling instructions for the server 25. The completed client server job ticket 64 is combined with the job in Print Data file 63 in the job file 60.

The client server job ticket includes information regarding a print file specification for the job file 60. In the illustrated embodiment of FIG. 3, the print file specification is designated with the parameters: "%XRXsourceFile" and "%XRXdestination". The significance of the print file specification to the present description will be discussed in further detail below.

The server 25 comprises any suitable interface for receiving job files 60 from workstations via network 20, with the ability to access and decode the job processing instructions on the accompanying client server job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 (FIG. 1) may be provided for this purpose.

The printing system 35 may include one or more high speed electronic printers 50 for processing jobs in accordance with the instructions input through the client server job ticket accompanying each job file. While a single printer 50 is shown, plural printers, either at a single central location or at several remote locations may be envisioned. Printer 50, for example, may be a xerographic based printer of the type shown and described in U.S. Pat. No. 5,170,340 to Prokop et al., the pertinent portions of which are incorporated herein. In other contemplated implementations of the preferred embodiment, the printer 50 could comprise other known printer types such as ink jet, ionographic, LED, and the like.

Figure 4:
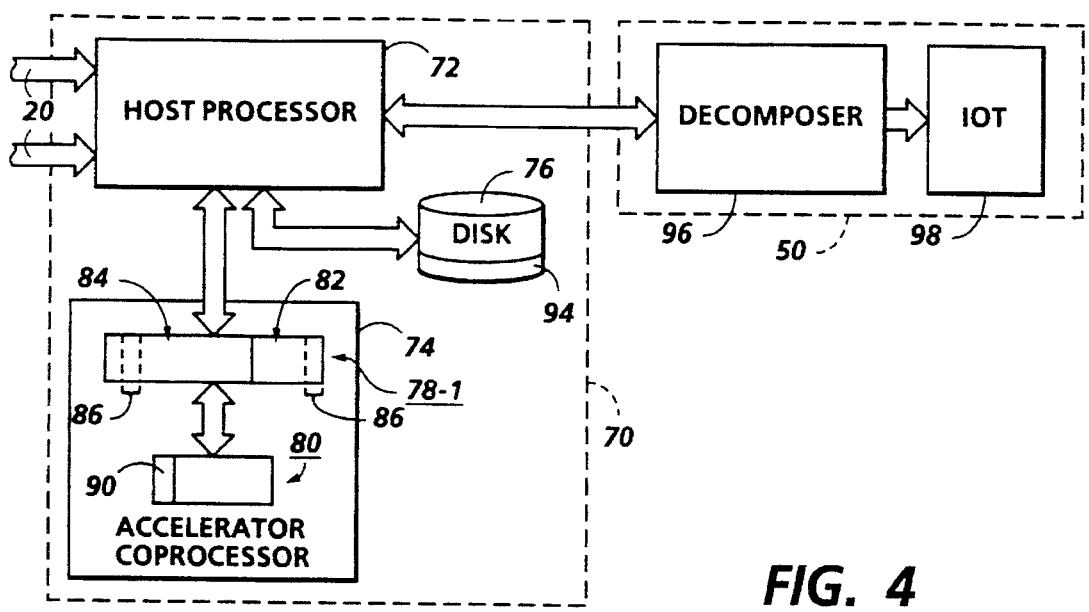
FIG. 4 is a schematic, block diagrammatic view of the printer and the print server.

Referring to FIG. 4, the structure of the server 25 and the printing system 35 is discussed in further detail. In the preferred embodiment of the invention, a swapping technique is achieved with an arrangement that is designated by the numeral 70. The software used to operate the arrangement 70 is hereinafter referred to as the "print service application". The arrangement includes a host processor 72, an accelerator coprocessor (ACP) card 74 and a disk storage device 76. In one example, the host processor is an IBM PC-AT system having an Industry Standard Architecture (ISA) or an Extended Industry Standard Architecture (EISA) bus to accept the ACP card. The host processor 72 can be configured for operation in a network environment. When the host processor 72 is configured for network operation, it is preferably Novell® certified for Netware 386™.

In the preferred embodiment, the ACP card 74 comprises the following major blocks:

80960CA Microprocessor

Host System ISA Interface

Extended Bus Interface

Memory (16 MBytes)

Programmable Read Only Memory

Timer/Counter

256 Byte Board Identification EEPROM

The host processor 72 is capable of transferring data to and from ACP memory through a 128K byte sliding shared memory window. The ACP 74 also can use a small section of the host processor's IO address space. By writing to an IO data port of the ACP 74, the host processor 72 is able to send commands to the ACP 74. In turn, by reading the IO data port, the host processor 72 is able to receive acknowledgement messages back from the ACP 74. These messages are typically 1 byte in length and are used to synchronize the actual data transfers in shared memory. In the preferred embodiment, two 8 bit data ports are used to communicate synchronizing swap requests and acknowledgements between the ACP 74 and the host processor 72 prior to the actual transfer of PDL decomposer code and font cache data. These two ports are referred to as: the Host to Processor and Processor to Host Data Registers ("HPDR" and "PHDR").

Figure 5:
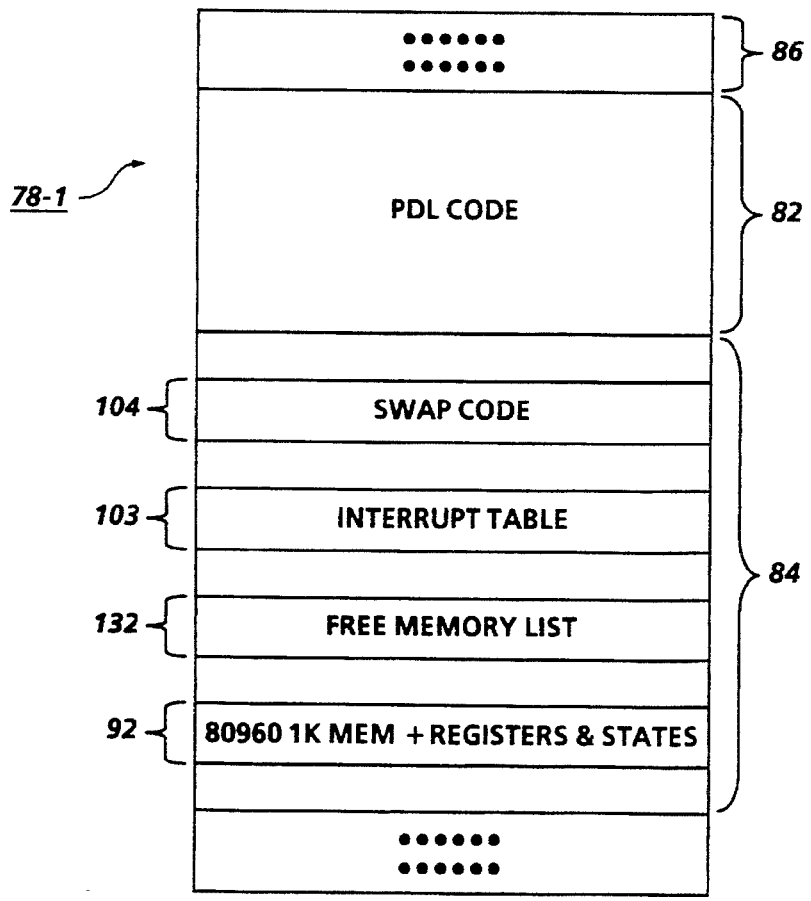
FIG. 5 is a schematic view of a memory map capable of being used to interpret a page description language ("PDL"), i.e. a sequence of instructions employed to translate PDL contained in the job file.

Referring still to FIG. 4, the ACP card 74 is shown with a memory map 78-1, which memory map 78-1 includes all of the software necessary to interpret a page description language, and the 80960CA microprocessor, the microprocessor being designated by the numeral 80. Referring to FIG. 5, the memory map 78-1, which includes a user section 82 and a system section 84, is shown in greater detail. The memory map 78-1 further includes a section 86 having registers through which the HPDR and the PHDR can communicate and a status flag can be set.

In the illustrated embodiment of FIG. 5, the user section 82 comprises a section for retaining PDL interpretation code, the PDL interpretation code being adapted to facilitate the interpretation of a job file expressed in a first PDL, such as PS or HP-PCL. In the preferred embodiment, the PDL interpretation code is written by either Adobe® Systems Inc. or Peerless®. Corp., in conjunction with Xerox® Corp., for use by Xerox® Corp. in its Xerox Production Print Services System ("Xerox Production Print Services" is a trademark of Xerox® Corp.), the Xerox Production Print Services System preferably including a Media Server and a Network Server. It should be understood that the PDL interpretation code facilitates translation of the job file 60 from a first PDL, such as PS or HP-PCL, into a second PDL file, such as Interpress. Those skilled in the art will appreciate that such translation could be, in one example, achieved by using a configurable PDL interpreter, such as one manufactured by Adobe® Systems Inc. or Peerless® Corp to reduce the text and graphics of the job file 60 into a bitmap and then to express the bitmap in the form of a second PDL, such as Interpress.

It should be appreciated that only selected portions of the system section 84 are shown. Much of the software for the section 84 simply serves as one of various approaches for implementing the processes illustrated in FIGS. 6 and 7A-7B, the significance of which processes will be discussed in further detail below. It will be recognized by those skilled in the art that, in practice, various software tools, such as tables, e.g., fault, system procedure and control tables, timers and controls therefore, control implementations, storage locations, and stacks, typically would be employed in the implementation of the system section 84.

Referring to FIGS. 4 and 5, the microprocessor 80 includes a section 90 which contains information regarding the internal state of the microprocessor 80, such information including 1K memory, registers and states. This information selectively can be stored in a layer 92 of the system section 84.

Referring specifically to FIG. 4, the host processor 72 is coupled with the disk drive device 76 so that, as explained in further detail below, portions of the memory map 78-1 can be transferred, in the form of a context file, thereto. Preferably, at any one moment, one or more PDL context files, designated by the numeral 94, are stored in the disk drive 76. Upon processing a job file 60, the interpreted PDL file can be transmitted to one of a plurality of output or printing devices. In the preferred embodiment, the interpreted PDL file is expressed in Interpress, and is transmitted to the printer 50 which comprises a decomposer 96 and an image output terminal (IOT) 98. In one example, the decomposer 96 is of the type used in a Xerox® 4045 ("Xerox 4045" is a trademark used by Xerox®) printer and employs software of the type described in Interpress: The Source Book. Additionally, the IOT can be any suitable print engine, such as the DocuTech™ print engine mentioned above. In operating the printer, the interpreted output from the host processor 72 is transmitted to the decomposer 96 where it is decomposed into graphics and text for printing by the IOT 98. Further details regarding the swapping technique implemented with the arrangement 70 is discussed in now allowed U.S. patent application Ser. No. 07/898,045 entitled "Method for Translating a Plurality of Printer Page Description Languages", the pertinent portions of which are incorporated herein.

Referring to FIG. 6 a known simplified network printing arrangement is shown in which one of the clients 14 (FIG. 1), using a first format to represent jobs, such as a DOS format, communicates with the printer 35 by way of a network operating system, such as Netware ("Netware" is a registered trademark of Novell, Inc.) which network operating system also uses the first format. While this simplified arrangement is well suited for many network printing situations, it is not well suited for handling the type of situation illustrated by FIG. 6 in which the client 14 uses a second format, which differs from the first format, and the workstation is coupled with the printer by way of a print server, the print server including the arrangement 70 (FIG. 4) and print service application software (not shown).

In one example, a job file ("file") is stored out to the disk 76 of arrangement 70 and a print request for the file is transmitted to the print service application (FIG. 4) from the client 14 (FIG. 1). For ease of discussion, the arrangements of FIGS. 1 and 4 are shown by FIG. 6 in a simplified form. In the illustrated embodiment of FIG. 6, a network operating system is shown as a single box, but in common practice, the network operating system would be integrated with the client 14 and the print service application. Moreover, it will be appreciated that the disclosed technique could be employed with other applications without affecting the concept upon which the disclosed technique is based.

In operation of the printing arrangement 10, the client 14 requests or calls a file by way of its file specification, the file specification including information regarding where the file is stored on the disk 76 (designated as "Volume Name" in FIGS. 8–10), the directory(s) which must be accessed in order to find the file and the name of the file. If the client uses a file specification format which is the same as the network operating system, (FIG. 6) the file can be processed in accordance with the request. If on the other hand, the file specification format differs from that of the network operating system format, as is the case for the illustrated embodiment of FIG. 6, then the print service application fails to recognize the file in the disk 76 and returns a fault message to the client. To aid the print service in recognizing the file whose format is different than that of the print service application, a file specification parser 200 is preferably included in the arrangement of FIG. 6.

Figure 7:
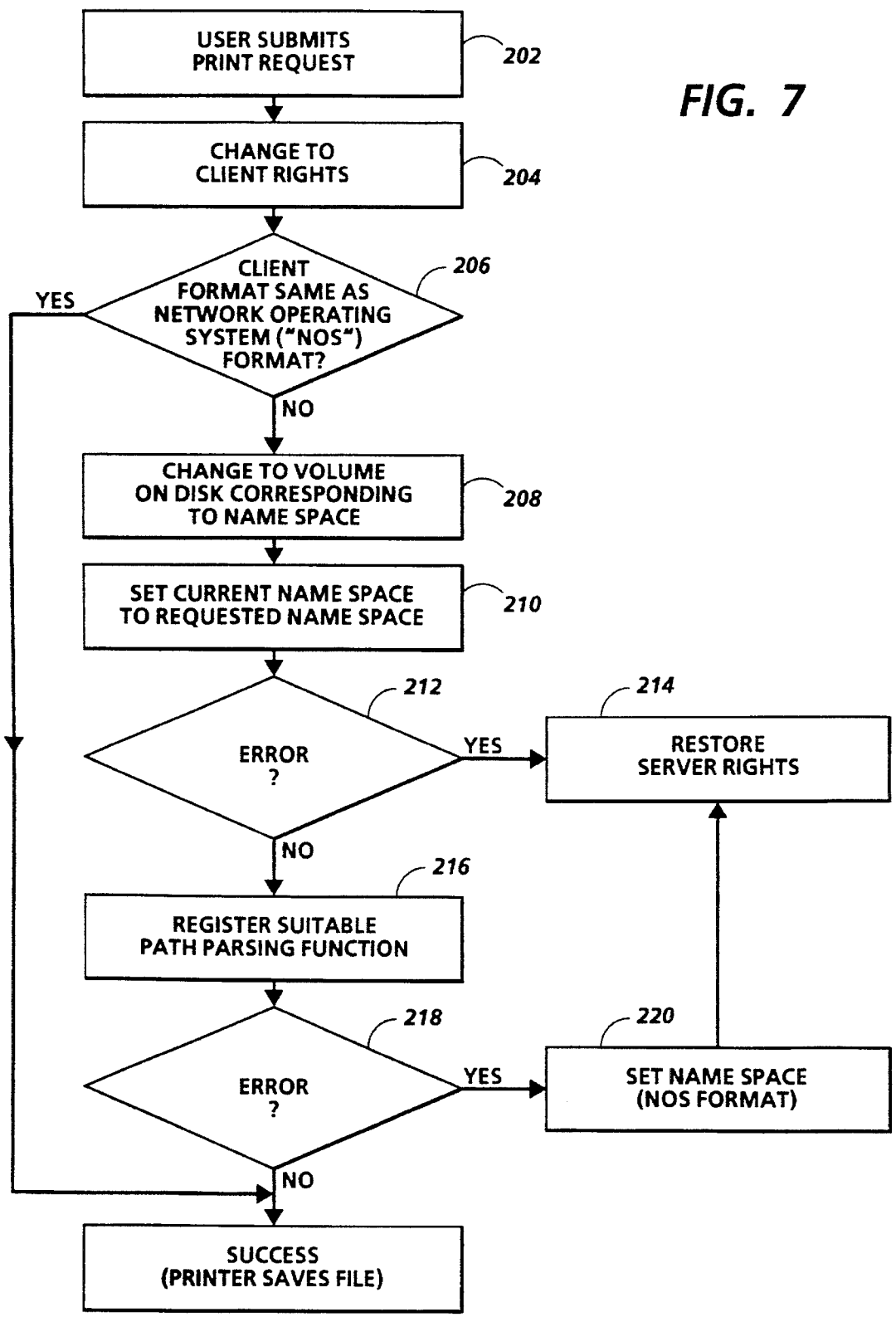
FIG. 7 is a flow diagram depicting a preferred procedure for setting up a print job request.
Figure 9:
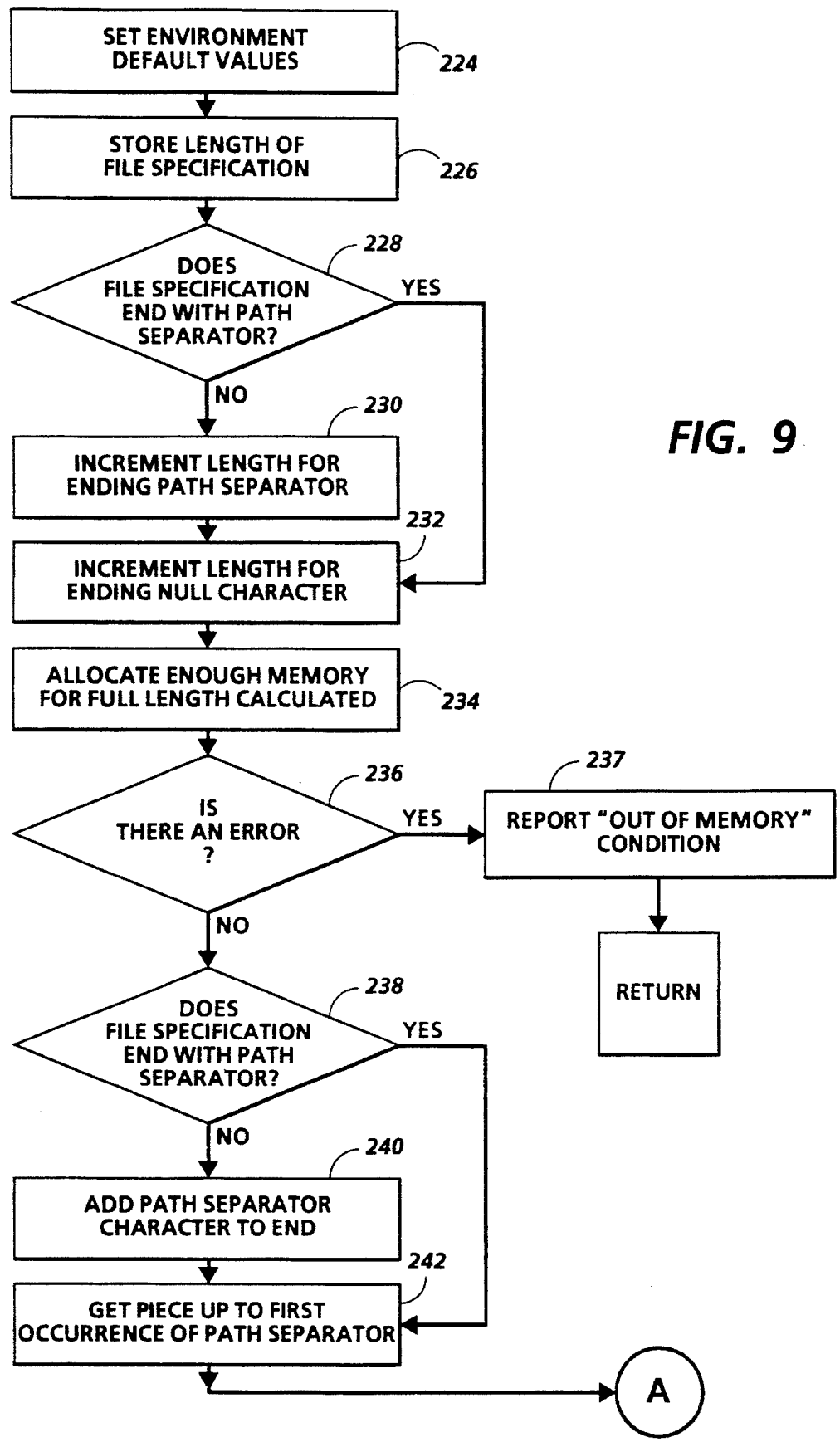
FIGS. 9–10 conjunctively represent a flow diagram depicting a preferred procedure for parsing a file specification to form an output string.
Figure 10:
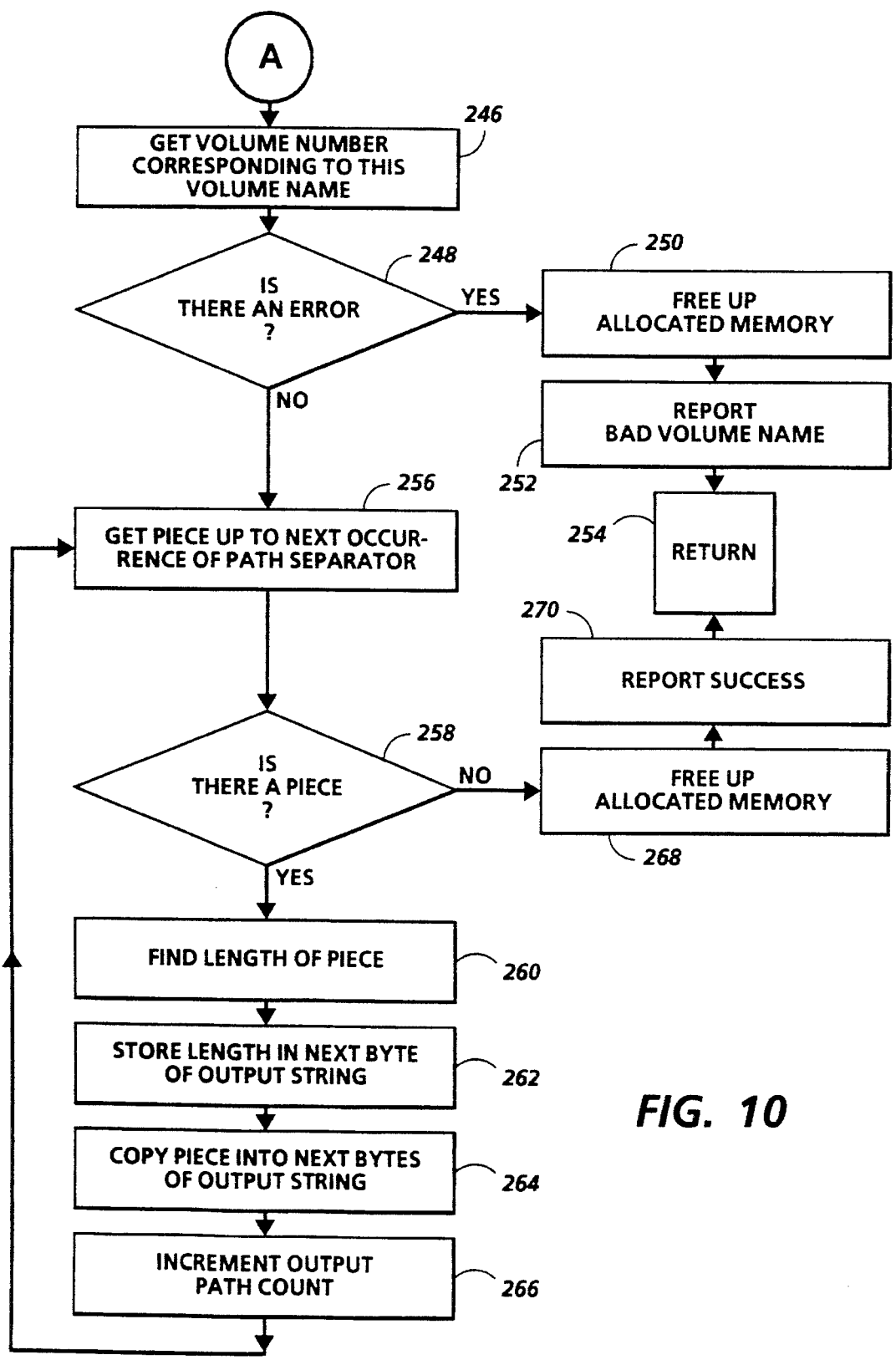

Referring to FIGS. 7–10, the operation of the file specification parser 200 is explained in further detail. Generally, FIG. 7 is directed toward setting up a print job request and FIGS. 8–10 are directed toward a preferred parsing routine. Referring specifically to FIG. 7, one of the clients 14 (FIG. 6) submits a print request (step 202) and the print server assumes, at step 204, the rights of that client. In one example, the network operating system employs Netware®, a system with a DOS™ format. Accordingly, if the client is DOS™ based, the parsing process is unnecessary (step 206). When the client uses a non-DOS™ based format, however, the default volume of the disk 76 is changed, at step 208, to be one that has a name space loaded on it corresponding with the print request. Referring again to FIG. 3, the name space derives from the file specification information of the job ticket. In one example, the name space relates to either a MAC or SUN operating system ("MAC" and "SUN" are respective trademarks of Apple Computers and Sun Systems). It will be appreciated by those skilled in the art that the concept of the preferred parsing technique can be applied with formats other than those used with MAC and SUN operating systems. Upon setting the current name space to the requested name space (step 210) the parser checks for errors (step 212). If an error exists due to, for example, the volume not having the name space, server rights are restored at step 214 and a fault message is issued. If no error is found at step 212, a suitable file specification parsing function, i.e., file specification parsing function is registered at step 216. If any error arises at step 218, the name space is set to DOS™ format (step 220) and server rights are restored at step 214: otherwise a success indication is issued at step 222.

Referring to FIG. 8, the basic principle underlying the operation of the parser 200 is shown. Essentially, the file specification, which is divided into a plurality of pieces that are respectively expressed by the terms "volume name", "directories" and "file name", is communicated to the parser 200 where the file specification is processed in accordance with the preferred method of FIGS. 9 and 10. As a result of the processing, an "output string", having a format compatible with the network operating system format, is generated.

Referring to FIGS. 9–10, the operation of the parser 200 is discussed in further detail. A file specification is inputted to the parser and, upon setting environmental default values (step 224), the length of the file specification, which varies as a function of the length of the names and directories (FIG. 8), is stored (step 226). During steps 228, 230 and 232, the file specification is prepared for parsing. In particular, the length of the file specification is calculated. The amount of memory required for the calculated length is allocated, at step 234 and an error check is performed at step 236. If there is an error, i.e., there is not enough memory, then the process reports an "OUT OF MEMORY CONDITION" (step 237) and returns from the parsing method; otherwise, per steps 238, 240 and 242, the process fetches a piece of the file specification which precedes a file specification separator. More specifically a volume name for the file specification is retrieved.

At step 246, the process gets a volume number which corresponds to the retrieved volume name and, at step 248 checks for any errors. If there is an error, the memory allocated at step 234 is freed up (step 250), a bad volume name is reported (step 252) and the process is returned (step 254). Assuming no error is found at step 248, another piece of the file specification is obtained (step 256), and the output string is generated with the steps 258, 260, 262, 264 and 266.

It should be appreciated that the output string is constructed to correspond with the format of the network operating system. In one example, the file specification format is parsed from either a MAC or SUN format into a Novell® Netware® format. As mentioned above the concept of the presently described parsing method is applicable to formats other than those of MAC, SUN and Novell®. It can be recognized that step 258 serves to check when the parsing method is complete. That is after each piece of the file specification has been used to construct the output string, the process is diverted to steps 268, 270 and 254 where, among other steps the memory allocated in step 234 is freed up and success is reported.

After the parsing method is complete the environment of the print service is restored. That is, the default volume is changed to be one that has a name space loaded on it corresponding with the format of the network operating system, and server rights are restored.

Numerous features of the present invention will be appreciated by those skilled in the art. One feature of the disclosed embodiment is that convenience is maximized for users of a network printing system with multiple client (workstation) types. That is, each user can designate his/her print file with a file specification that corresponds with his/her platform without any concern as to the format of the network operating system. Another feature of the disclosed embodiment is that the manner in which the user's file specification is handled by the printing system is transparent to the user. This sort of transparency enhances the marketability of the disclosed printing system since it facilitates the user's capability to obtain demand reprint across a large variety of native platform environments.

What is claimed is:

1. A data processing system for outputting selected data from a data file with a data output device, the data file being identified by a first file specification expressed in a first format, the first format including a volume name, at least one directory and a file name, comprising:

an input device for generating the data file;

a server communicating with both said input device and the data output device;

a memory communicating with said server, the data file being transmitted from said input device to said server, and said server managing a storage of the data file in said memory;

a network operating system cooperating with said input device, the data output device and said server to permit communication between said input device and the data output device for outputting the selected data of the data file at the data output device in response to a request transmitted from said input device to said server, the request identifying the data file by its first file specification, and said network operating system processing data files each identified by a second file specification expressed in a second format;

wherein, said input device functions with said network operating system, by way of said server, on the basis of a user set of rights, and said server performs selected functions, in conjunction with said network operating system, on the basis of a default set of rights;

a parsing system, communicating with said server, for parsing the volume name, the at least one directory and the file name to produce an output string expressed in terms of the second format;

said server determining that the data file is expressed in the first format;

when it is determined, by said server, that the file specification of the data file is expressed in the first format, said parsing system being registered, with said server, for automatically parsing the volume name, the at least one directory and the file name to produce the output string in a manner that is transparent to said input device so that said server, by reference to the output string, recognizes the data file stored in said memory and initiates transmission of the data file to the data output device for outputting of the selected data of the data file;

said server, in determining the format in which the data file is expressed, simulating the user set of rights to function, in conjunction with said network operating system, on the basis of the user set of rights; and said server, after parsing the volume name, the at least one directory and file name to the output string, automatically relinquishing the user set of rights and resuming functioning, in conjunction with said network operating system, on the basis of the default set of rights.

2. The printing system of claim 1, wherein said parsing system resides in said server.

3. The data processing system of claim 1, wherein:

said data processing system comprises a printing system;

said data file comprises a print file with print data;

said data output device comprises a printing machine; and said service application comprises a print server application.

4. The data processing system of claim 1, wherein said print server is operatively coupled with said printing machine.

5. The data processing system of claim 1 wherein said input device comprises a workstation.

6. A data processing system for outputting selected data from a data file with a data output device, the data file being identified by a first file specification expressed in a first format, the first format including a volume name, at least one directory and a file name, comprising:

an input device for generating the data file;

a server communicating with both said input device and the data output device;

a memory communicating with said server, the data file being transmitted from said input device to said server, and said server managing a storage of the data file in said memory;

a network operating system cooperating with said input device, the data output device and said server to permit communication between said input device and the data output device for outputting the selected data of the data file at the data output device in response to a request transmitted from said input device to said server, the request identifying the data file by its first file specification, and said network operating system processing data files each identified by a second file specification expressed in a second format;

a parsing system, communicating with said server, for parsing the volume name, the at least one directory and the file name to produce an output string expressed in terms of the second format;

wherein, the output string includes both a plurality of pieces and a plurality of length indicators, and each piece of the plurality of pieces is coupled with one of the plurality of length indicators;

said server determining that the data file is expressed in the first format; and when it is determined, by said server, that the file specification of the data file is expressed in the first format, said parsing system being registered, with said server, for automatically parsing the volume name, the at least one directory and the file name to produce the output string in a manner that is transparent to said input device so that said server, by reference to the output string, recognizes the data file stored in said memory and initiates transmission of the data file to the data output device for outputting of the selected data of the data file.

7. The data processing system of claim 6, wherein said parsing system resides in said server.

8. The data processing system of claim 6, wherein:

said data processing system comprises a printing system;

said data file comprises a print file with print data;

said data output device comprises a printing machine; and said server comprises a print server.

9. The data processing system of claim 8, wherein said print server is operatively coupled with said printing machine.

10. The data processing system of claim 6 wherein said input device comprises a workstation.

11. The printing system of claim 6, wherein;

said input device functions with said network operating system, by way of said server, on the basis of a user set of rights;

said server performs selected functions, in conjunction with said network operating system, or the basis of a default set of rights;

said server, in determining the format in which the data file is expressed, simulates the user set of rights to function, in conjunction with said network operating system, on the basis of the user set of rights; and said server, after parsing the volume name, the at least one directory and file name to the output string, automatically relinquishes the user set of rights and resumes functioning, in conjunction with said network operating system, on the basis of the default set of rights.

12. In a data processing system with a data input device, a data output device and a data file identified by a first file specification expressed in a first format, the first format including a volume name, at least one directory and a file name, a method of outputting selected data from the data file comprising:

generating the data file;

transmitting the data file from the data input device to a server, the data input device functioning with the network operating system, by way of the server, on the basis of a user set of rights, the server managing a storage of the data file in a memory and performing selected functions, in conjunction with the network operating system, on the basis of a default set of rights;

transmitting a request from the input device to the server by way of a network operating system, the request identifying the data file by its first file specification and the network operating system processing data files each identified by a second file specification expressed in a second format;

determining that the data file is expressed in the first format, said determining including the server simulating the user set of rights to function, in conjunction with the network operating system on the basis of the user set of rights;

when it is determined the file specification of the data file is expressed in the first format, registering a parsing system with said server for automatically parsing the volume name, the at least one directory and the file name, with the parsing system, to produce an output string in a manner that is transparent to the input device so that the server, by reference to the output string, recognizes the data file stored in the memory and initiates transmission of the data file to the data output device for outputting selected data of the data file; and after parsing the volume name, the at least one directory and file name to the output string, the server automatically relinquishing the user set of rights and resuming functioning, in conjunction with said network operating system, on the basis of the default set of rights.

13. The method of claim 12, further comprising:

configuring the data processing system as a printing system;

configuring the data file as a print file with print data;

configuring the data output device as a printing machine; and configuring the server as a print service application.

14. The method of claim 13, further comprising operatively coupling the print server with the printing machine.

15. The method of claim 12, wherein said transmitting a request comprises transmitting the request from a workstation.

16. In a data processing system with a data input device, a data output device and a data file identified by a first file specification expressed in a first format, the first format including a volume name, at least one directory and a file name, a method of outputting selected data from the data file comprising:

generating the data file;

transmitting the data file from the input device to a server, the server managing a storage of the data file in a memory;

transmitting a request from the input device to the server by way of a network operating system, the request identifying the data file by its first file specification and the network operating system processing data files each identified by a second file specification expressed in a second format;

determining that the data file is expressed in the first format;

when it is determined that the file specification of the data file is expressed in the first format, registering a parsing apparatus in said server for automatically parsing the volume name, the at least one directory and the file name, with the parsing apparatus, to produce an output string in a manner that is transparent to the input device so that the server, by reference to the output string, recognizes the data file stored in the memory and initiates transmission of the data file to the data output device for outputting selected data of the data file;

said automatically parsing including parsing the volume name, the at least one directory and the file name so that the output string includes both a plurality of pieces and a plurality of length indicators; and wherein each of the plurality of pieces is coupled with one of the plurality of length indicators.

17. The method of claim 16, further comprising:

configuring the data processing system as a printing system;

configuring the data file as a print file with print data;

configuring the data output device as a printing machine; and configuring the server as a print server.

18. The method of claim 17, further comprising operatively coupling the print server with the printing machine.

19. The method of claim 16, wherein said transmitting a request comprises transmitting the request from a workstation.

* * * * *